US008375070B2

(12) United States Patent
Shinde et al.

(10) Patent No.: US 8,375,070 B2
(45) Date of Patent: Feb. 12, 2013

(54) COLLECTIVE OPERATIONS IN A FILE SYSTEM BASED EXECUTION MODEL

(75) Inventors: Pravin Shinde, Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/874,267

(22) Filed: Sep. 2, 2010

(65) Prior Publication Data

US 2012/0060018 A1 Mar. 8, 2012

(51) Int. Cl.
*G06F 17/30* (2006.01)

(52) U.S. Cl. ....................................................... 707/822

(58) Field of Classification Search .................. None
See application file for complete search history.

(56) References Cited

U.S. PATENT DOCUMENTS

| | | | | |
|---|---|---|---|---|
| 6,085,199 | A * | 7/2000 | Rose | 707/823 |
| 6,704,310 | B1 * | 3/2004 | Zimmermann et al. | 370/389 |
| 6,721,880 | B1 * | 4/2004 | Pike | 713/1 |
| 7,376,860 | B2 | 5/2008 | Jia et al. | |
| 7,669,000 | B2 * | 2/2010 | Sharma et al. | 710/310 |
| 2009/0006810 | A1 | 1/2009 | Almasi et al. | |
| 2009/0276803 | A1 * | 11/2009 | Weaver | 725/32 |
| 2010/0122268 | A1 | 5/2010 | Jia | |

OTHER PUBLICATIONS

A Pipe Namespace in the Portal Filesystem. Blog entry. Apr. 13, 2005 [retrieved on Sep. 25, 2012]. Retrieved from the Internet: <URL: www.spinellis.gr/blog/20050413/>.*

Addison-Wesley Inc., Argonne National Laboratory, and the NSF Center for Research on Parallel Computation. Designing and Building Parallel Programs [online]. v.1.3. 1995 [retrieved on Sep. 25, 2012]. Retrieved from the Internet:< URL: http://www.mcs.anl.gov/~itf/dbpp/text/node97.html>.*

Salgar. 'Linux IPC—Multiple writers, single reader'. In stackoverflow.com [online]. Sep. 15, 2009; 16:08 [retrieved on Sep. 25, 2012]. Retrieved from the Internet: <URL: http://stackoverflow.com/questions/1428117/linux-ipc-multiple-writers-single-reader>.*

Toub, Stephen. Stream Pipeline. Electronic version of MSDN Magazine article .NET Matters, Feb. 2008 issue, [retrieved on Sep. 25, 2005]. Retrieved from the Internet: <URL: http://msdn.microsoft.com/en-us/magazine/cc163290.aspx>.*

Spasmr. 'Winsock recv(), what if more data was sent than the buffer can hold?'. In codefuru.com [online]. Feb. 14, 2008; 01:42 [retrieved on Sep. 25, 2012]. Retrieved from the Internet: <URL: http://forums.codeguru.com/showthread.php?446068-Winsock-recv()-what-if-more-data-was-sent-than-the-buffer-can-hold>.*

(Continued)

*Primary Examiner* — Neveen Abel Jalil
*Assistant Examiner* — Tyler Torgrimson
(74) *Attorney, Agent, or Firm* — Francis Lammes; Stephen J. Walder, Jr.; Eustus D. Nelson (57) ABSTRACT

A mechanism is provided for group communications using a MULTI-PIPE synthetic file system. A master application creates a multi-pipe synthetic file in the MULTI-PIPE synthetic file system, the master application indicating a multi-pipe operation to be performed. The master application then writes a header-control block of the multi-pipe synthetic file specifying at least one of a multi-pipe synthetic file system name, a message type, a message size, a specific destination, or a specification of the multi-pipe operation. Any other application participating in the group communications then opens the same multi-pipe synthetic file. A MULTI-PIPE file system module then implements the multi-pipe operation as identified by the master application. The master application and the other applications then either read or write operation messages to the multi-pipe synthetic file and the MULTI-PIPE synthetic file system module performs appropriate actions.

20 Claims, 3 Drawing Sheets

OTHER PUBLICATIONS

Chan, Philip et al., "Netfiles: An Enhanced Stream-Based Communication Mechanism", High-Performance Computing, 6th International Symposium, ISHPC, 2005, First International Workshop on Advanced Low Power Systems, ALPS 2006, 254-261, 2008, 8 pages.

U.S. Appl. No. 13/563,120.

* cited by examiner

COLLECTIVE OPERATIONS IN A FILE SYSTEM BASED EXECUTION MODEL

This invention was made with United States Government support under Contract No. DE-FG02-08ER25851 awarded by the United States Department of Energy. The Government has certain rights in this invention.

BACKGROUND

The present application relates generally to an improved data processing apparatus and method and more specifically to mechanisms for a file system interface for point-to-point and collective operations.

As computation moves to multi-core and distributed computing systems, the traditional way of performing computations, i.e. isolated in a single process on a single core, is increasingly anachronistic. Operating environments for modern "cloud" systems must handle two different, but increasingly similar, execution environments: multi-core central processing units (CPUs) and distributed computing systems based on commodity hardware. The challenge in these loosely couple, massively parallel computing systems is to coordinate workloads and provide communication to maximize the utilization of the hardware.

The inability to maximize the workload has lead to dataflow computing systems, both in the applications and in middleware. These computing systems, built on top of commodity systems, create distributed models for fault tolerance and the distribution of computation. However, since this middleware is not tightly integrated with their underlying systems, current development has moved to an entirely new world: new languages, new runtimes, and another level of abstraction on top of traditional computing systems. Taking a middleware approach, while powerful, both constrains and abandons many computing system design principles that make programs portable, usable and responsive.

Furthermore, existing tools cannot be easily transferred or used in conjunction with each other. These new computing systems require that you implement new modules in whatever specific language the middleware uses (typically C++ or Java), wrap sequential code, interact through runtime specific languages, or make use of language bindings. This has led to the constant reimplementation of well understood tools to work within these frameworks, which is not always practical for many large application bases. Constantly re-solving the same problems for each new run-time.

SUMMARY

In one illustrative embodiment, a method, in a data processing system, is provided for group communications using a MULTI-PIPE synthetic file system. The illustrative embodiment creates a multi-pipe synthetic file in a plurality of multi-pipe synthetic files in the MULTI-PIPE synthetic file system. In the illustrative embodiment, a master application indicates a multi-pipe operation to be performed by writing a header-control block to a multi-pipe synthetic file using a specific offset. In the illustrative embodiment, the header-control block specifies at least one of a multi-pipe synthetic file system name, a message type, a message size, a specific destination, or a specification of the multi-pipe operation. The illustrative embodiment opens the multi-pipe synthetic file in the MULTI-PIPE synthetic file system using at least one other application in the plurality of applications participating in group communications. The illustrative embodiment signals a MULTI-PIPE file system module in an operating system of the multi-pipe operation using the MULTI-PIPE synthetic file system. The illustrative embodiment then implements the multi-pipe operation as identified by the master application using the MULTI-PIPE file system module. In the illustrative embodiment, the master application and the at least one other application in the group communication either read or write operation messages to the multi-pipe synthetic file. In the illustrative embodiment, the messages are signaled to the MULTI-PIPE files system module and the MULTI-PIPE synthetic file system module performs an appropriate action based on the mode identified by the master application.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for a file system interface for point-to-point and collective operations. The illustrative embodiments provide a multi-pipe mechanism which builds upon the familiar syntax of pipes but provides features and functions to better support emerging scale-out computing environments and applications. The term pipe refers to the way applications are hooked together in order to communicate and cooperate. Similar to a pipe, the illustrative embodiments are accessed purely through the file system namespace using only pre-existing file system operations. In order to accomplish this, the illustrative embodiments build the mechanism as a synthetic file system, one which does not use any backing storage like a typical file system.

Figure 1:
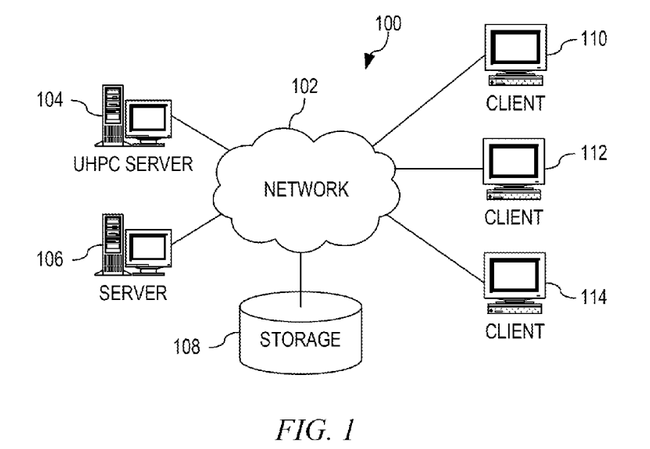
FIG. 1 depicts a pictorial representation of an example distributed data processing system in which aspects of the illustrative embodiments may be implemented.
Figure 2:
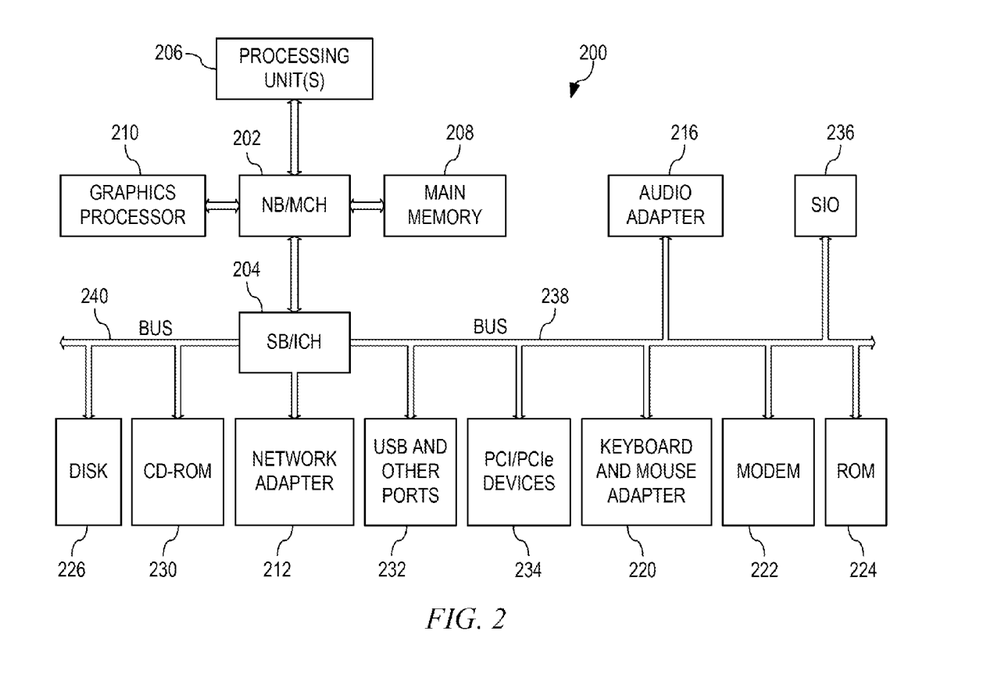
FIG. 2 shows a block diagram of an example data processing system in which aspects of the illustrative embodiments may be implemented.

Thus, the illustrative embodiments may be utilized in many different types of data processing environments including a distributed data processing environment (through the use of established distributed resource protocols and distributed file systems), a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a file system interface for point-to-point and collective communications, this is only an example and is not intended to state or imply any limitation with regard to the features of the present invention. To the contrary, the illustrative embodiments are intended to include distributed data processing environments and embodiments in which point-to-point and collective communications may be implemented in a file system interface.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a multi-pipe mechanism which builds upon the familiar syntax of pipes but provides features and functions to better support emerging scale-out computing environments and applications. Similar to a pipe, the mechanism may be primarily accessed purely through the file system namespace using only pre-existing file system operations. In order to accomplish this, the mechanism is implemented as a synthetic file system that does not use any backing storage like a typical file system.

Figure 3:
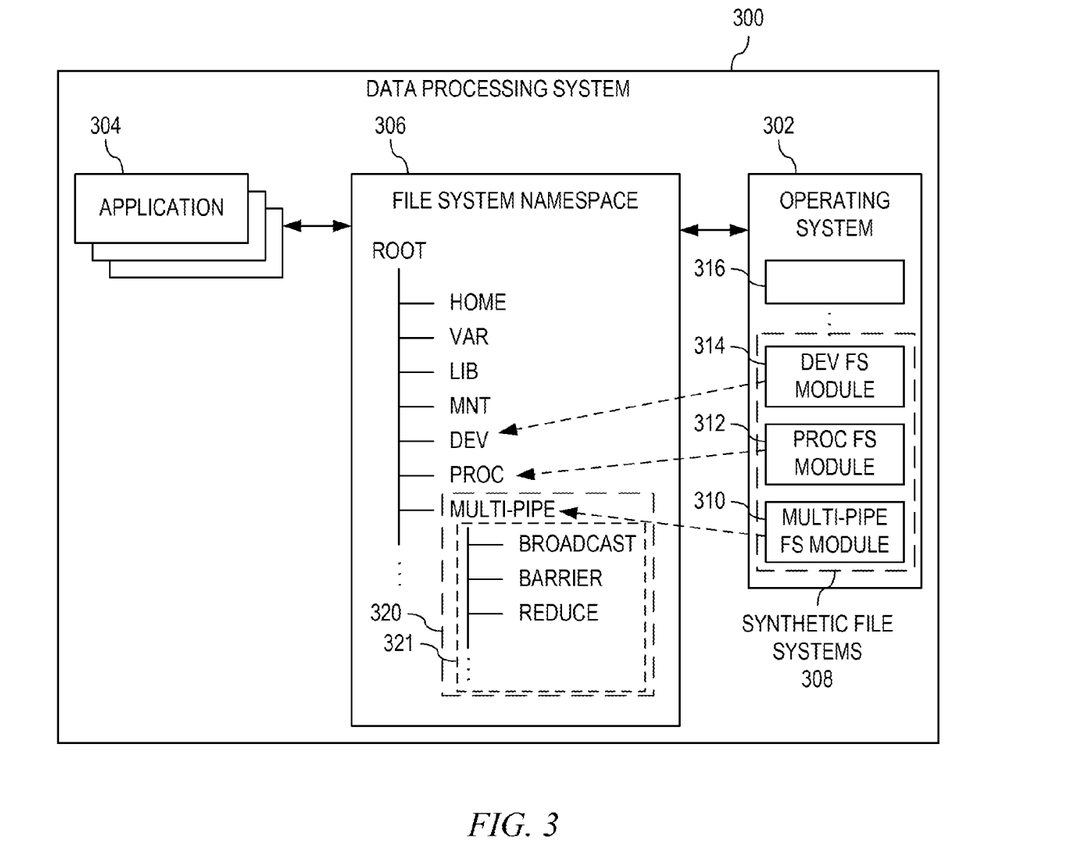
FIG. 3 depicts a block diagram of a file system interface for point-to-point and collective operations in accordance with an illustrative embodiment.

FIG. 3 depicts a block diagram of a file system interface for point-to-point and collective operations in accordance with an illustrative embodiment. Data processing system 300 comprises operating system 302, applications 304, and file system namespace 306. File system namespace 306 provides a uniform interface to applications 304. Under the hood of this uniform interface, file system namespace 306 includes other file systems, including synthetic file systems. In FIG. 3, the entries DEV, PROC, and MULTI-PIPE are synthetic file systems 308 whose functionalities are provided by MULTI-PIPE file system module 310, PROC-FS module 312, and DEV-FS module 314, respectively. Applications 304 interact with file system namespace 306, and depending on which directories an application in applications 304 is interacting with, a corresponding file system module 310-316 in operating system 302 handles these requests of the application. For example, any interaction by an application within MULTI-PIPE synthetic file system 320 will be handled by MULTI-PIPE file system module 310. That is, MULTI-PIPE file system module 310 may be used by any application in applications 304 by mounting one of multi-pipe synthetic files 321 in file system namespace 306. As opposed to file systems that are purely part of an operating system, MULTI-PIPE file system module 310 may be implemented as user space file servers, may be embedded within the operating system itself as built-in file systems, or may be a set of dynamically loaded modules.

MULTI-PIPE synthetic file system 320 may be constructed to allow allocation of new instances of multi-pipe synthetic files 321 via user action, either by leveraging existing file-system interfaces, such as using a 'create' system call with a path within the synthetic file hierarchy of MULTI-PIPE synthetic file system 320, or by using a synthetic control file which applications 304 may send commands to in order to allocate new instances of multi-pipe synthetic files 321. While file system namespace 306 may comprise files/directories for operations such as home, var, lib, mnt, dev, proc, or the like, the illustrative embodiments are directed to a new type of synthetic file, namely multi-pipe. Multi-pipes are communication channels that provide a hook between applications or processes of applications 304. MULTI-PIPE synthetic file system 320 may also be constructed such that applications 304 may mount one or more of multi-pipe operations represented by multi-pipe synthetic files 321 by opening one or more multi-pipes using mount options to MULTI-PIPE synthetic file system 320 that allow specification of parameters for a particular multi-pipe instance for each multi-pipe opened to the one or more of multi-pipe synthetic files 321. If the mount option is not used, applications 304 may use parameters to MULTI-PIPE synthetic file system 320 that may be set via a header-control block (discussed in detail below).

Each particular multi-pipe instance opened by applications 304 may be represented within the synthetic file hierarchy of MULTI-PIPE synthetic file system 320 as a single file, whose name is established as a parameter by either a create operation, a mount operation, a control-file write operation, or the like. Besides the name, applications 304 may also associate a preset type with each particular multi-pipe which establishes behavior on certain collective operations. A collective operation is an operation that requires a subset of all processes participating in a parallel job to wait for a result whose value depends on one or more input values provided by each of the participating processes. Typically, collectives are implemented by all processes within a communicator group calling the same collective communication function with matching arguments. Essentially, a collective operation is an operation that is performed on each member of a collective, e.g., each processor unit in a collective of processor units, using the same controls, i.e. arguments. Some examples of collective operations supported by multi-pipe include broadcast, reduce, splice, barrier, allreduce, enumerated, or the like.

Since normal file system operations may be used as the interface to MULTI-PIPE synthetic file system 320, distributed access to MULTI-PIPE synthetic file system 320 may be provided by a standard distributed file system protocol such as the 9P distributed resource protocol, network file sharing (NFS), Andrew file sharing (AFS), remote file sharing (RFS), or the like. Applications 304 may use a standard distributed file system protocol that allows the use of the file system namespace as an organization principle with standard file system controls on access controls and operation permissions and also allows applications 304 using the file system interface of MULTI-PIPE synthetic file system 320 to operate in a similar fashion on local and remote instances of the synthetic file system interface.

Multi-pipe operations within the hierarchy of MULTI-PIPE synthetic file system 320 are reflected by MULTI-PIPE file system module 310 to MULTI-PIPE synthetic file system 320. MULTI-PIPE synthetic file system 320 uses the file hierarchy to track each open of its interfaces for multi-pipes and associate the open with a particular application in applications 304 and also track whether the application 304 has opened the multi-pipe as a reader or writer. Similar to opening a multi-pipe, when all writers of a multi-pipe close, MULTI-PIPE synthetic file system 320 marks the multi-pipe as hungup and any subsequent readers of a particular multi-pipe file receive an EOF from MULTI-PIPE synthetic file system 320. When all readers and writers close, MULTI-PIPE synthetic file system 320 resets the multi-pipe so that the multi-pipe may be reused. When MULTI-PIPE synthetic file system 320 resets a multi-pipe, any special flags, such as broadcasts, enumerations, reduces, or the like, will persist.

For normal read and write operations, MULTI-PIPE synthetic file system 320 may operate identical to known pipe usage, except that the multi-pipe utilization of the illustrative embodiments are unidirectional and only a single synthetic file is provided per multi-pipe instance. That is, the multi-pipes of the illustrative embodiments are unidirectional because an application, which may also be referred to as a process, may open a multi-pipe in only one mode, either read mode or write mode. This makes the MULTI-PIPE unidirectional from the perspective of the application. Thus, in this mode the application may either read or write the multi-pipe instance but not both. If two applications want bi-directional communication, then two multi-pipes will be used, one multi-pipe for read and another multi-pipe for write. Also, there isn't any implicit buffering by the multi-pipes that are opened to MULTI-PIPE synthetic file system 320, so multi-pipe synthetic files 321, operating in a write mode, will block until an operation completes, for example, until multi-pipe synthetic files 321 pass all written data to all appropriate receivers or participants, i.e. other applications or processes employed to execute the current operation.

In addition to normal reads and writes, applications 304 may inject header-control blocks into a multi-pipe, which may either act as control messages or describes the data following the header. Since the multi-pipes of the illustrative embodiments are not expected to honor traditional file system operation offsets, a master application in applications 304, which may be referred to as initiators, and/or other applications in applications 304, which may be referred to as participants or sub-processes, may mark header-control block in the packets being sent by writing at offset (ulong)~0, −1, or the like. (ulong)~0 refers to the largest possible value which may fit in a particular memory location, "~" is bitwise complement operator and "~0" represents complement of the value zero, i.e. a value with all bits one. In unsigned number notation, value with all bits one is the largest possible value. In the illustrative embodiments, (ulong)~0 signifies a special offset value.

Offsets as used in traditional file systems, such as files on a disk, are used to read the data from a particular location. But in case of traditional pipes, data is not stored on persistent storage and the read operation on pipe is destructive, i.e. data is destroyed once the data is read. Because of destructive reads, traditional pipes do not allow a read from any location, all reads are always performed at the beginning of the data, i.e. offset of zero. Because of this, operations on traditional pipes will ignore the value of offset and always use zero as offset. However, in the illustrative embodiments, MULTI-PIPE file system module 310 makes use of the provided offset value in special way. If the offset is zero, then MULTI-PIPE file system module 310 will treat that operation as a normal data operation. But if the offset is some fixed unique value, then MULTI-PIPE file system module 310 understands that application is trying to send special control message, and MULTI-PIPE file system module 310 will handle this request in special way based on the content of the special control message. That is, applications 304 are able to send more information to MULTI-PIPE file system module 310 without breaking existing system-calls infrastructure.

Again, since the multi-pipes of the illustrative embodiments are not expected to honor traditional file system operation offsets, only the master application may set the type of the multi-pipe synthetic file. Any other applications used in the group communications may only use header-control blocks. Thus, a master application or process owns the multi-pipe and that master application or process is super-user for that multi-pipe. All other participating applications or processes may only perform normal operations. The illustrative embodiments implement this restriction so that control messages that are used to change the behavior of the multi-pipe and hence the illustrative embodiments do not want any participating application and process changing the behavior of the multi-pipe simultaneously. Thus, the fields of the header-control block, in order, are:

a. type—header type (single byte)
b. size—size of message (in bytes)
c. enum—destination pipe enumeration (numeric)
d. param—parameter string, which may include:
  i. name for multi-pipe id initialization
  ii. destination path for splice operations
  iii. equation for reduction
*Not all fields are used by all header types.

A master application or process may instruct a multi-pipe to behave in a specific manner by passing a packet to synthetic file 321 with an encoded header-control block that specifies at least one of a message type, a message size, a specification of a control packet, or a specification of the multi-pipe operation by writing to a specific offset. For example, a broadcast packet informs multi-pipe synthetic file 321 to behave as broadcast medium. The following is a partial example of the packets that may be supported by MULTI-PIPE file system module 310, for example:

a. 'n'—changes/sets the name of the multi-pipe
b. 'p'—specifies a packet which can be used for long messages or enumerated pipes
c. 'b'—same as 'p' but specifies the packet should be broadcast to all current readers
e. 'E'—specifies that his pipe is enumerated and gives the maximum enumeration
f. 'B'—specifies that all messages on this pipe should be broadcast
g. '+'—specifies that this pipe should be treated as a reduction operation
h. 'o'—specifies an open barrier operation
i. 'r'—specifies a read barrier operation
j. 'w'—specifies a write barrier operation
k. 'c'—specifies a close barrier
l. '0'—clears pipe type (such as 'B', 'E', '+', 'o', 'r', 'w', 'c',)
m. '>'—specifies a splice to control block
n. '<'—specifies a splice from control block Thus, as opposed to known systems where parallel programming operations are implemented either in the kernel or in middleware which is specifically tied to the operating system that is being implemented and both constrains and abandons many computing system design principles that make programs portable, usable, and responsive, the illustrative embodiments provide MULTI-PIPE synthetic file system 320 which is presented as an interface to applications 304 for implementation by operating system 302. That is, MULTI- PIPE synthetic file system 320 is not operating system specific and may be mounted by any type of operating system where parallel programming operations are required.

At a high level, when a master application in applications 304 requires a mechanism for group communication, then the master application creates a multi-pipe synthetic file in multi-pipe synthetic files 321 within MULTI-PIPE synthetic file system 320. The master application then writes a header-control block to multi-pipe synthetic file in MULTI-PIPE synthetic file system 320 indicating how the multi-pipe synthetic file should perform and any restrictions for the other applications employed in the group communication. Once the master application sends the control message, other applications that are participating in the group communication open the same multi-pipe synthetic file within MULTI-PIPE synthetic files system 320 and then communication can start. Each of the other applications opens the same multi-pipe synthetic file 321 in the MULTI-PIPE synthetic file system 320, each multi-pipe limited to only being used in the mode directed by the master application and is not able to send any control messages. MULTI-PIPE synthetic file system 320 then signals MULTI-PIPE file system module 310 in operating system 302 of the requested multi-pipe operation and MULTI-PIPE file system module 310 implements the multi-pipe operation as identified by the request. The mode that the other applications open the multi-pipe synthetic file in is dependent on the multi-pipe operation requested by the master application.

In order to provide examples of how the illustrative embodiments may handle different multi-pipe operations, the illustrative embodiments provide the following examples.

MULTI-PIPE have two types of implicit operations, determined by virtue of the number of applications 304 which have them open for reading or writing. When there is one writer and multiple readers, the MULTI-PIPE is said to be a fan out operation. When there is multiple writers and a single reader, the MULTI-PIPE is said to be a fan in operation.

In a fan out operation, the master application in applications 304 opens the initial multi-pipe in a write mode. The master application then initializes the one or more other applications in applications 304 required for the group communication. Since this is a fan out operation, each of the other applications opens the same multi-pipe inside MULTI-PIPE synthetic file system 320 in a read mode. Multi-pipe file system module 310 then receives the write message from the master application on the multi-pipe opened in the write mode that is to be fanned out to the other applications. MULTI-PIPE file system module 310 blocks the writing master application in applications 304, and when any of the other applications perform the read operation on this multi-pipe, MULTI-PIPE file system module 310 delivers the message to the other application and unblocks the writing master application in applications 304. This way, the messages generated by the master applications are distributed between other applications depending on the order in which they read.

In a fan in operation, which is complimentary to the fan out operation, the master application in applications 304 opens the initial multi-pipe in READ mode. The master application then initializes the one or more other applications in applications 304 required for the group communication. Since this is a fan in operation, each of the other applications opens the same multi-pipe synthetic files 321 in synthetic file system 320 in a write mode. Multi-pipe file system module 310 then receives the write message from the other applications on the same multi-pipe opened in a write mode. MULTI-PIPE file system module 310 takes written data and blocks the writer until it has been read by the master application.

Thus, the underlying mechanism of multiple pipes of the illustrative embodiments support both fan out and fan in operations as well as the case of when there are many readers and many writers. Thus, the different readers and writers are isolated from one another by MULTI-PIPE synthetic file system 320 enabling application appropriate multiplexing without the limitations of native file system I/O multiplexing of operating system 302. Similar to normal pipes, in non-enumerated multi-pipe synthetic files 321, individual applications reading a specific multi-pipe synthetic file receive complete messages in a round robin fashion from the master application without fragment message intermixing.

However, on traditional pipes this multiplexing is limited by the underlying atomic input/output (I/O) capabilities of the operation system which limit the size of data which can be written in a single system call. The illustrative embodiments overcome this limitation by having the master application implement long messages as a component of the header-control block. Long messages, those intended for a single reader sub-process, but with a size greater than the atomic I/O buffer size capable from multi-pipe synthetic files 321, may be accommodated by using a header-control block with the size field specifying the total size of the message. The master application will be linked to a particular reader application/sub-process until that many bytes have been sent as data messages. Thus, the master applications delivers the long message as a contiguous unit to a specific reader application/sub-process.

Another limitation of traditional pipes is there is no way to direct messages to a particular application/sub-process. This is very useful in the context of map/reduce type operations where the desire is to distribute writes with similar hash signatures to a particular reader application/sub-processes. The illustrative embodiments add the idea of enumerated multi-pipes which are a variant of fan-out pipes which allow the master application being the writer to specify a designated reader sub-process for any particular message (including long messages as mentioned above). The only effective way to use enumerated pipes is to specify the number of reader sub-processes enumerations as part of the instance specification for the multi-pipe, or using an 'E' control block as discussed previously. By specifying enumerations as part of the instance specification for the multi-pipe, the master application creates the specified number of slots for enumerations as part of the pipes. New reader application/sub-processes will be assigned round-robin to these slots as they open their individual multi-pipe. That is, an application writing a message with a header-control block is directed to a specific enumerated reader queue where it will be received by a specific application when read from the multi-pipe file. An attempt to back fill reader application/sub-processes to underpopulated slots is made in order to balance the reader application/sub-processes among the available slots and allow new reader application/sub-processes to fill in gaps left by old reader application/sub-processes. If a reader application/sub-process for a particular enumeration is not yet available, then the master application, being the writer, will block.

In a splicing operation, the master application in applications 304 links the created multi-pipes associated with each of the various tasks being performed with the sub-processes together or tethers the multi-pipes associated with each of the various tasks being performed by the sub-processes to normal pipes or even to normal files provided by operating system 302. Normal pipes are used to collect the output generated by one process or application and feed it as the input to another process or application. Unfortunately, use of normal pipes allows for the feed for input of one process or application with output of only one other process or application, creating a one-to-one mapping. Splicing allows for collection of output from many processes or applications and as a feed to a single process or application. Hence, splicing creates one-to-many mappings. The splice from splice control message from the master application will start a thread which will act as a writer, reading new data from the target path specified in the header-control block. Either thread will exit on receiving EOF or an error from their target. Neither currently makes use of the size or which field in the header-control block.

Broadcast operations are specialized fan-out operations which provide a copy of the message to each active reader. In a broadcast operation, the master application or process in applications 304 opens an initial multi-pipe synthetic files 321 in write mode to MULTI-PIPE synthetic file system 320. The master application then writes the broadcast control message to set the type of the multi-pipe into broadcast using the header-control block. The other applications or sub-processes individually open the same multi-pipe synthetic files 321 in a read mode. By the master application writing the broadcast control message to multi-pipe synthetic files 321, the master application triggers synthetic file system 320 to signal MULTI-PIPE file system module 310 in operating system 302 of the requested multi-pipe broadcast operation, which is then mounted by MULTI-PIPE file system module 310. The other applications issue a read request, which is blocked by MULTI-PIPE file system module 310 until the master application, which is the writer, writes a broadcast message. Once the master application writes the broadcast message into the multi-pipe, MULTI-PIPE file system module 310 unblocks all of the other applications and MULTI-PIPE file system module 310 returns their read call with the same message written by the master application. At this point, all of the other applications close multi-pipe and the master application either closes the initial multi-pipe or resets the initial multi-pipe for a different operation.

Barrier operations are a useful during collective communication to ensure a consistent system state, in particular with respect to the number of active participants and sometimes more specifically to the number of active readers or writers. In a barrier operation, the master application or process in applications 304 opens an initial multi-pipe synthetic file 321 in write mode to MULTI-PIPE synthetic file system 320. The master application then writes a barrier control message to set the type of the multi-pipe into barrier and specify the exact number of participants for the barrier operation in the enumeration field. For example, assuming that the barrier operation is on the specific number of the open operations. MULTI-PIPE synthetic file system 320 then signals MULTI-PIPE file system module 310 in operating system 302 of the requested multi-pipe barrier operation, which MULTI-PIPE file system module 310 blocks. Other applications start opening the same multi-pipe synthetic file 321 in the required mode. MULTI-PIPE file system module 310 blocks all these open operations. Once the number of open calls on the multi-pipe synthetic file 321 matches the number specified in barrier condition, MULTI-PIPE file system module 310 returns all of the open calls. Also, MULTI-PIPE file system module 310 returns a special control message write request to create the barrier from the master application at the same time.

Reduce operations are a specialized form of fan-in operations which also perform an operation (or set of operations) on the values being received from the other applications and return a single value on the master application which initiated the reduce operation. In a reduce operation, the master application or process in applications 304 opens an initial multi-pipe synthetic file 321 in write mode in MULTI-PIPE synthetic file system 320. The master application then writes the reduce control message to set the type of the multi-pipe into reduce. Other applications then open the same multi-pipe in a write mode. MULTI-PIPE synthetic file system 320 then signals MULTI-PIPE file system module 310 in operating system 302 of the requested multi-pipe reduce operation.

At this point the master application opens the same multi-pipe again in read mode so that the final reduced value will be read by the master application. The master application then issues a read request which is blocked by MULTI-PIPE file system module 310 until all of the values of the write operations are received from the other applications and the requested reduce operation is performed. The sort of operations supported for reduction are implementation dependent, but common operations, such as accumulate, average, or the like, are supported as well as message passing interface (MPI) style operations, such as SUM, MAX, MIN, PROD, LAND, BAND, LOR, BOR, LXOR, BXOR, MINLOC, MAXLOC, or the like. While in most cases the values written by the other applications will be interpreted as values as opposed to strings, the illustrative embodiments recognize that options may be provided to specify the types of the values, such as integers, floats, double precision numbers, or the like.

Once MULTI-PIPE file system module 310 receives the written values from the other applications, MULTI-PIPE file system module 310 performs the requested reduce operation, unblocks the master application and returns the read call of the master application with the result of the reduce operation. At this point, all of the other applications close multi-pipe and the master application either closes the initial multi-pipe or resets the initial multi-pipe for a different operation.

Allreduce is a specialized form of reduce in which all of the other applications receive a copy of the result of the reduce operation from MULTI-PIPE file system module 310. That is, once each of the other applications writes their values to MULTI-PIPE file system module 310, the other application opens the same multi-pipe synthetic file 321 again in the read mode so that the final reduced value may be read. Once the multi-pipe synthetic file 321 is opened in read mode for the other application, the other application issues a read request which is blocked by MULTI-PIPE file system module 310 until all of the values of the write operations are received from the other applications and the requested reduce operation is performed. Once MULTI-PIPE file system module 310 receives the written values from the other applications, MULTI-PIPE file system module 310 performs the requested reduce operation, unblocks the master application and the other applications and returns the read call of the master application and the other applications with the result of the reduce operation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
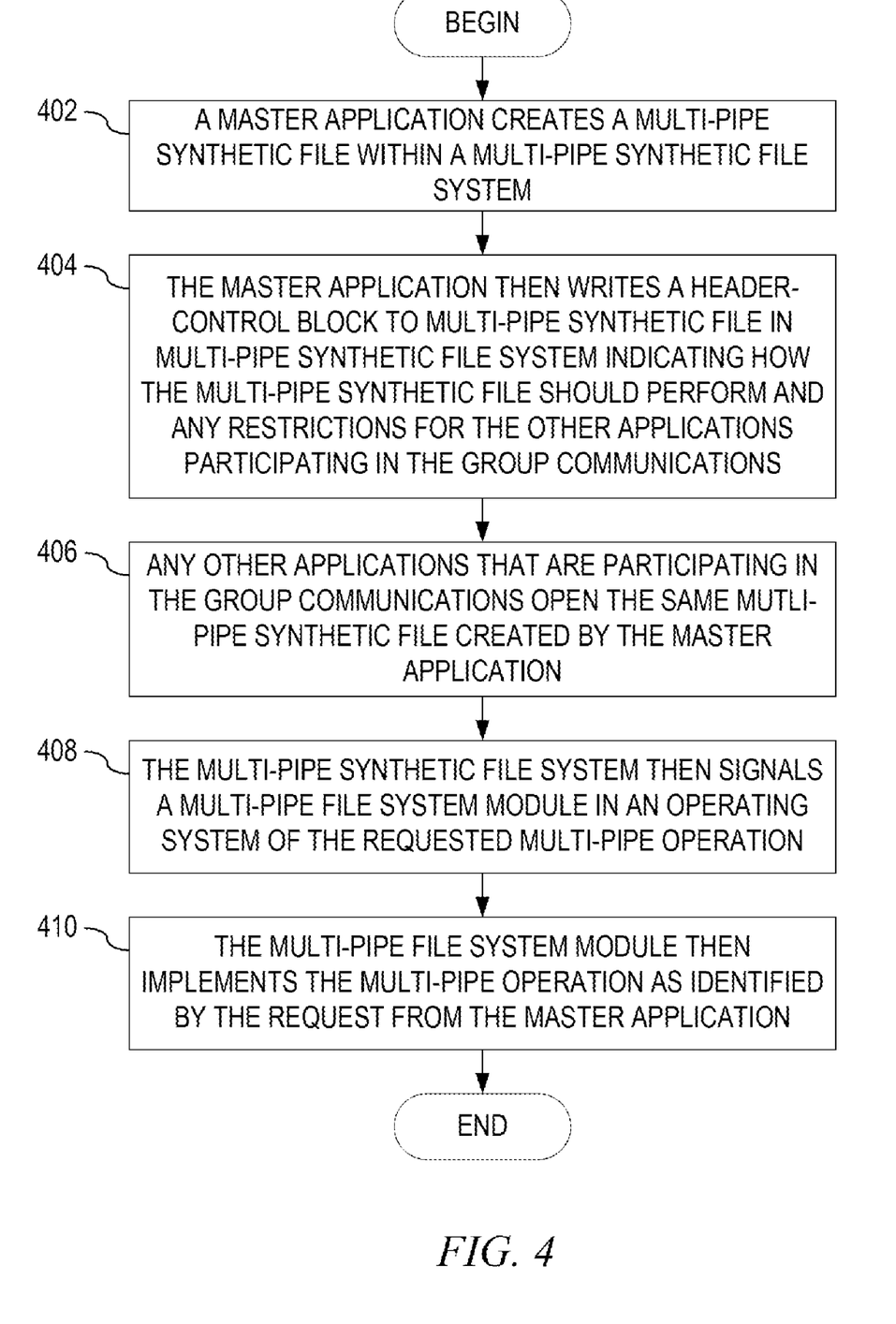
FIG. 4 depicts a high level operation performed in a data processing system for group communications using a MULTI-PIPE synthetic file system in accordance with an illustrative embodiment.

Referring now to FIG. 4, this figure provides a flowchart outlining example operations of a mechanism that provides a file system interface for point-to-point and collective operations. FIG. 4 depicts a high level operation performed in a data processing system for group communications using a MULTI-PIPE synthetic file system in accordance with an illustrative embodiment. As the operation begins, a master application, which is requiring a mechanism for group communication, creates a multi-pipe synthetic file within the MULTI-PIPE synthetic file system (step 402). The master application then writes a header-control block to the multi-pipe synthetic file in MULTI-PIPE synthetic file system indicating how the multi-pipe synthetic file should perform and any restrictions for the other applications employed in the group communications (step 404). Once the master application sends the control message, any other applications that are participating in the group communications open the same multi-pipe synthetic file (step 406). Each of the other applications opens the same multi-pipe synthetic file in the MULTI-PIPE synthetic file system, each multi-pipe limited to only being used in the mode directed by the master application and is not able to send any control messages. The MULTI-PIPE synthetic file system then signals a MULTI-PIPE file system module in an operating system of the requested multi-pipe operation (step 408). The MULTI-PIPE file system module then implements the multi-pipe operation as identified by the request from the master application (step 410), with the operation terminating thereafter. The mode that the other applications open the multi-pipe synthetic file in is dependent on the multi-pipe operation requested by the master application.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a multi-pipe mechanism which builds upon the familiar syntax of pipes but provides features and functions to better support emerging scale-out computing environments and applications. Similar to a pipe, the mechanism may be primarily accessed purely through the file system namespace using only pre-existing file system operations. In order to accomplish this, the mechanism is implemented as a synthetic file system that does not use any backing storage like a typical file system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

create, using a master application in the computing device, a multi-pipe synthetic file in a plurality of multi-pipe synthetic files in the MULTI-PIPE synthetic file system, wherein the master application indicates a multi-pipe operation to be performed;

write, using the master application, a header-control block to the multi-pipe synthetic file specifying at least one of a multi-pipe synthetic file system name, a message type, a message size, a specific destination, or a specification of the multi-pipe operation by writing to a specific offset;

open, using at least one other application in the plurality of applications participating in the group communications, the multi-pipe synthetic file in the MULTI-PIPE synthetic file system;

signal, using the MULTI-PIPE synthetic file system, a MULTI-PIPE file system module in an operating system of the multi-pipe operation; and implement, using the MULTI-PIPE file system module, the multi-pipe operation as identified by the master application, wherein the master application and the at least one other application in the group communication either read or write operation messages to the multi-pipe synthetic file, wherein the master application writing a message that is longer than an atomic I/O buffer size of the multi-pipe synthetic file is delivered using the header-control block with the message size specifying a total size of the message and as a contiguous unit to at least one other application, wherein the messages are signaled to the MULTI-PIPE files system module, and wherein the MULTI-PIPE synthetic file system module performs an appropriate action based on the mode identified by the master application.

2. The computer program product of claim 1, wherein the multi-pipe synthetic file opened by the at least one other application is limited to only being used in the mode directed by the master application and wherein the at least one other application is not able to send any control messages.

3. The computer program product of claim 1, wherein the mode that the at least one other applications open the multi-pipe synthetic file in is dependent on the multi-pipe operation requested by the master application.

4. The computer program product of claim 1, wherein the MULTI-PIPE file system module is implemented as at least one of user space file servers, embedded within the operating system itself as built-in file systems, or a set of dynamically loaded modules.

5. The computer program product of claim 1, where the MULTI-PIPE synthetic file system is constructed to allow allocation of new instances of the plurality of multi-pipe synthetic files via user action, either by leveraging existing file-system interfaces or by using a synthetic control file which the plurality of applications sends commands to allocate new instances of the plurality of multi-pipe synthetic files.

6. The computer program product of claim 1, wherein any application writing a message with a header-control block is directed to a specific enumerated reader queue where the message will be received by a specific application when read from the multi-pipe file.

7. The computer program product of claim 1, wherein the master application writing a broadcast message to the multi-pipe synthetic file triggers a copy of the broadcast message to be delivered to all applications in the group communications reading from the multi-pipe synthetic file by encoding a broadcast flag in the header-control block.

8. The computer program product of claim 1, where different ones of the at least one other application are isolated from one another by the MULTI-PIPE synthetic file system enabling application appropriate multiplexing without the limitations of native file system I/O multiplexing of the operating system and wherein, in non-enumerated multi-pipe synthetic files, individual ones of the at least one other application reading from the multi-pipe synthetic file receive complete messages in a round robin fashion from the master application without fragmented messages being intermixed.

9. The computer program product of claim 1, where the master application changes the multi-pipe synthetic file system name of the multi-pipe synthetic file by writing to the header-control block of the multi-pipe synthetic file and wherein the master application clears the specification of the multi-pipe operation of the multi-pipe synthetic file by writing to the header-control block of the multi-pipe synthetic file.

10. The computer program product of claim 1, wherein:
all of the at least one other application opening the multi-pipe synthetic file are blocked until a first predetermined number of the at least one other application are blocked as specified by the master application in the header-control block written to the multi-pipe synthetic file by the master application,
all of the at least one other application reading the multi-pipe synthetic file are blocked until a second predetermined number of the at least one other application reading the multi-pipe synthetic file are blocked as specified by the master application in the header-control block written to the multi-pipe synthetic file by the master application,
all of the at least one other application writing the multi-pipe synthetic file are blocked until a third predetermined number of the at least one other application writing the multi-pipe synthetic file are blocked as specified by the master application in the header-control block written to the multi-pipe synthetic file by the master application,
the master application writing a control message to the multi-pipe file synthetic file is blocked until a fourth predetermined number of the at least one other application have closed the multi-pipe synthetic file as specified by the master application in the header-control block written to the multi-pipe synthetic file by the master application, and
the master application writes a reduction control message to the multi-pipe synthetic file, a subsequent read on the multi-pipe synthetic file by the master application will block until all of the at least one other applications which have opened the multi-pipe synthetic file for writing to the multi-pipe synthetic file write a value to the multi-pipe synthetic file forming a set of values and the MULTI-PIPE file system module reduces the set of values and returns a result of the reduction to the master application and wherein all of the at least one other applications receive the result of the reduction from the MULTI-PIPE file system module.

11. An apparatus, comprising:
a processor; and
a memory coupled to the processor, wherein the memory comprises instructions which, when executed by the processor, cause the processor to:
create, using a master application in the apparatus, a multi-pipe synthetic file in a plurality of multi-pipe synthetic files in the MULTI-PIPE synthetic file system, wherein the master application indicates a multi-pipe operation to be performed;
write, using the master application, a header-control block to the multi-pipe synthetic file specifying at least one of a multi-pipe synthetic file system name, a message type, a message size, a specific destination, or a specification of the multi-pipe operation by writing to a specific offset;
open, using at least one other application in the plurality of applications participating in the group communications, the multi-pipe synthetic file in the MULTI-PIPE synthetic file system;
signal, using the MULTI-PIPE synthetic file system, a MULTI-PIPE file system module in an operating system of the multi-pipe operation; and
implement, using the MULTI-PIPE file system module, the multi-pipe operation as identified by the master application, wherein the master application and the at least one other application in the group communication either read or write operation messages to the multi-pipe synthetic file, wherein the master application writing a message that is longer than an atomic I/O buffer size of the multi-pipe synthetic file is delivered using the header-control block with the message size specifying a total size of the message and as a contiguous unit to at least one other application, wherein the messages are signaled to the MULTI-PIPE files system module, and wherein the MULTI-PIPE synthetic file system module performs an appropriate action based on the mode identified by the master application.

12. The apparatus of claim 11, wherein the multi-pipe synthetic file opened by the at least one other application is limited to only being used in the mode directed by the master application and wherein the at least one other application is not able to send any control messages.

13. The apparatus of claim 11, wherein the mode that the at least one other applications open the multi-pipe synthetic file in is dependent on the multi-pipe operation requested by the master application.

14. The apparatus of claim 11, wherein the MULTI-PIPE file system module is implemented as at least one of user space file servers, embedded within the operating system itself as built-in file systems, or a set of dynamically loaded modules.

15. The apparatus of claim 11, where the MULTI-PIPE synthetic file system is constructed to allow allocation of new instances of the plurality of multi-pipe synthetic files via user action, either by leveraging existing file-system interfaces or by using a synthetic control file which the plurality of applications sends commands to allocate new instances of the plurality of multi-pipe synthetic files.

16. The apparatus of claim 11, wherein any application writing a message with a header-control block is directed to a specific enumerated reader queue where the message will be received by a specific application when read from the multi-pipe file.

17. The apparatus of claim 11, wherein the master application writing a broadcast message to the multi-pipe synthetic file triggers a copy of the broadcast message to be delivered to all applications in the group communications reading from the multi-pipe synthetic file by encoding a broadcast flag in the header-control block.

18. The apparatus of claim 11, where different ones of the at least one other application are isolated from one another by the MULTI-PIPE synthetic file system enabling application appropriate multiplexing without the limitations of native file system I/O multiplexing of the operating system and wherein, in non-enumerated multi-pipe synthetic files, individual ones of the at least one other application reading from the multi-pipe synthetic file receive complete messages in a round robin fashion from the master application without fragmented messages being intermixed.

19. The apparatus of claim 11, where the master application changes the multi-pipe synthetic file system name of the multi-pipe synthetic file by writing to the header-control block of the multi-pipe synthetic file and wherein the master application clears the specification of the multi-pipe operation of the multi-pipe synthetic file by writing to the header-control block of the multi-pipe synthetic file.

20. The apparatus of claim 11, wherein:
all of the at least one other application opening the multi-pipe synthetic file are blocked until a first predetermined number of the at least one other application are blocked as specified by the master application in the header-control block written to the multi-pipe synthetic file by the master application, all of the at least one other application reading the multi-pipe synthetic file are blocked until a second predetermined number of the at least one other application reading the multi-pipe synthetic file are blocked as specified by the master application in the header-control block written to the multi-pipe synthetic file by the master application, all of the at least one other application writing the multi-pipe synthetic file are blocked until a third predetermined number of the at least one other application writing the multi-pipe synthetic file are blocked as specified by the master application in the header-control block written to the multi-pipe synthetic file by the master application, the master application writing a control message to the multi-pipe file synthetic file is blocked until a fourth predetermined number of the at least one other application have closed the multi-pipe synthetic file as specified by the master application in the header-control block written to the multi-pipe synthetic file by the master application, and the master application writes a reduction control message to the multi-pipe synthetic file, a subsequent read on the multi-pipe synthetic file by the master application will block until all of the at least one other applications which have opened the multi-pipe synthetic file for writing to the multi-pipe synthetic file write a value to the multi-pipe synthetic file forming a set of values and the MULTI-PIPE file system module reduces the set of values and returns a result of the reduction to the master application and wherein all of the at least one other applications receive the result of the reduction from the MULTI-PIPE file system module.

* * * * *